«12» United States Patent
Burt (10) Patent No.: US 9,915,047 B2
(45) Date of Patent: Mar. 13, 2018

(54) ENERGY DISSIPATOR

(71) Applicant: Technion Research & Development Foundation Limited, Haifa (IL)

(72) Inventor: Michael Burt, Haifa (IL)

(73) Assignee: Neptunetech Ltd., Kiryat Bialik (IL)

(*) Notice: Subject to any disclaimer, the term of this patent is extended or adjusted under 35 U.S.C. 154(b) by 0 days.

(21) Appl. No.: 15/497,901

(22) Filed: Apr. 26, 2017

(65) Prior Publication Data

US 2017/0260707 A1    Sep. 14, 2017

Related U.S. Application Data

(63) Continuation of application No. 14/414,954, filed as application No. PCT/IL2013/050598 on Jul. 16, 2013.

(60) Provisional application No. 61/671,808, filed on Jul. 16, 2012.

(51) Int. Cl.
| | |
|---|---|
| *E02B 3/06* | (2006.01) |
| *E02B 3/04* | (2006.01) |
| *B28B 7/00* | (2006.01) |
| *B28B 7/18* | (2006.01) |

(52) U.S. Cl.
CPC ............. *E02B 3/062* (2013.01); *B28B 7/00* (2013.01); *B28B 7/18* (2013.01); *E02B 3/046* (2013.01); *E02B 3/06* (2013.01)

(58) Field of Classification Search
CPC . E02B 3/04; E02B 3/046; E02B 3/062; E02B 3/129
See application file for complete search history.

(56) References Cited

U.S. PATENT DOCUMENTS

| | | | |
|---|---|---|---|
| RE24,632 E | 4/1959 | Danel et al. |
| 2,900,699 A | 8/1959 | Danel |
| 2,909,037 A | 10/1959 | Palmer |
| 3,091,087 A | 5/1963 | Danel |
| 3,663,346 A | 5/1972 | Schoen |
| 3,822,499 A | 7/1974 | De Vos |
| 3,896,624 A | 7/1975 | Chang |
| 3,913,336 A | 10/1975 | Figari |
| 3,931,697 A | 1/1976 | Pearce |
| 5,080,526 A | 1/1992 | Waters |
| 5,623,790 A | 4/1997 | Lalvani |
| 6,896,445 B1 | 5/2005 | Engler |
| 7,226,245 B2 | 6/2007 | Kent et al. |
| 7,572,083 B1 | 8/2009 | Bishop et al. |
| 2002/0152708 A1 | 10/2002 | Kimura et al. |
| 2004/0182299 A1 | 9/2004 | Kent et al. |

(Continued)

FOREIGN PATENT DOCUMENTS

| | | |
|---|---|---|
| CN | 202214706 U | 5/2012 |
| EP | 0934357 B1 | 11/2004 |

(Continued)

OTHER PUBLICATIONS

Supplemental European Search Report EP13819437, dated Feb. 1, 2016.

*Primary Examiner* — Frederick L Lagman
(74) *Attorney, Agent, or Firm* — McDonnell Boehnen Hulbert & Berghoff LLP (57) ABSTRACT

An energy dissipater comprising a plurality of periodic hyperbolic surfaces, forming a continuous surface-structure, and enveloping contiguous tunnels there through.

20 Claims, 10 Drawing Sheets

(56) References Cited

U.S. PATENT DOCUMENTS

| | | | |
|---|---|---|---|
| 2008/0040984 A1 | 2/2008 | Lanahan | |
| 2012/0051845 A1 | 3/2012 | Alkon et al. | |
| 2015/0010364 A1* | 1/2015 | Alkon | E02B 3/06 405/218 |
| 2016/0083924 A1* | 3/2016 | Birnhack | E02B 17/025 405/224 |

FOREIGN PATENT DOCUMENTS

| | | | |
|---|---|---|---|
| FR | 2579643 A1 | 10/1986 | |
| FR | 2891556 A1 | 4/2007 | |
| GB | 2228715 A | 9/1990 | |
| GB | 2445945 A | 7/2008 | |
| RU | 2455432 C2 | 7/2012 | |
| WO | 2000/006827 A1 | 2/2000 | |
| WO | WO-2007039692 A1 * | 4/2007 | E02B 3/04 |
| WO | 2010082198 A2 | 7/2010 | |

* cited by examiner

ENERGY DISSIPATOR

FIELD OF THE INVENTION

The present invention relates to permeable, sponge-like structures.

BACKGROUND

A breakwater is designed to oppose-alternate (by absorption or reflection or both) the energy of pounding waves, thus generating a protected, calm water activity zone or (in some utilizations) a land front mass protected from the erosive power of the sea, all that with the lowest possible cost and lowest environmental damage.

Conventional Breakwaters
1. Fill-material based breakwaters are typically constructed from:
    sand and rock rubble mounds (the sizes of the rocks depend on the hydrodynamic conditions on site)
    sloped revetment walls, with a concrete block crust, and land-rubble backing (supported by weighty concrete tetrapods or similar constructs)
2. Caisson (vertical wall) breakwaters with fill material, to provide for mass and resistance against overturning.
3. Complementary caisson-rubble mound-revetment breakwaters in various functionally dictated combinations.

The bathymetric conditions, the impacting wave energy and the availability of fill-materials are the deciding factors of the breakwaters' realization and their costs. Fill-material breakwaters, because of their geometric wide-base configuration, reach their techno economical limit with the water depth of about 20-25 meters, beyond which, with every additional meter of depth, the material quantities become a critical economic constraint.

Caisson (front or rear solution) technology is relatively expensive in shallow waters, but with the growing depth, the cost of the rubble mound or the revetment wall may outpace it considerably.

It should be borne in mind that the fill-material approach for breakwater construction, dredged or mined or excavated from nature and transported and deposited on site, is not just costly but also environmentally questionable-negative-destructive. Thus in many coastal conditions the fill-material approach (when considered on a large scale) is not a viable option.

An object is to provide improved wave-energy dissipating structures adapted for uses such as breakwaters, acoustic walls and heat exchangers.

SUMMARY OF THE INVENTION

According to one aspect, a permeable sponge breakwater is provided, comprising a plurality of doubly-curved hyperbolic paraboloids or minimal infinite polyhedral inter connected surface shells, or any other forms resembling their forming a continuous surface-structure, enveloping contiguous tunnels there through.

Embodiments comprising a plurality of hyperbolic-paraboloid like shells, as previously specified, are constructed from any kind of material, such as reinforced concrete, steel sheets, plastic raisins, composite materials, etc.

The shells may comprise concrete, shotcrete, ferrocement, fibre-reinforced concrete, etc.

The concrete may comprise at least one reinforcing material, such as shotcrete, wires (metal, plastics, composite . . . ), ferrocement, f.r.p. (fibre reinforced plastics), meshes, e.g., metal meshes (corrosion resistant) and so forth.

In some embodiments the overall shape is modular, comprised of geometrically repetitive units, thus enabling to facilitate efficient mass production.

The shells may be shaped in a manner which conforms to various space symmetry categories, such as manifested in cubic; diamond; cube centered; edge centered: octet lattice configurations and the like.

The tunnels may be arranged according to a dual-intertwined cubic network's pair.

In some embodiments the periodic shells surface structure units have genus values between 2 and 13.

Figures 1A, 1B:
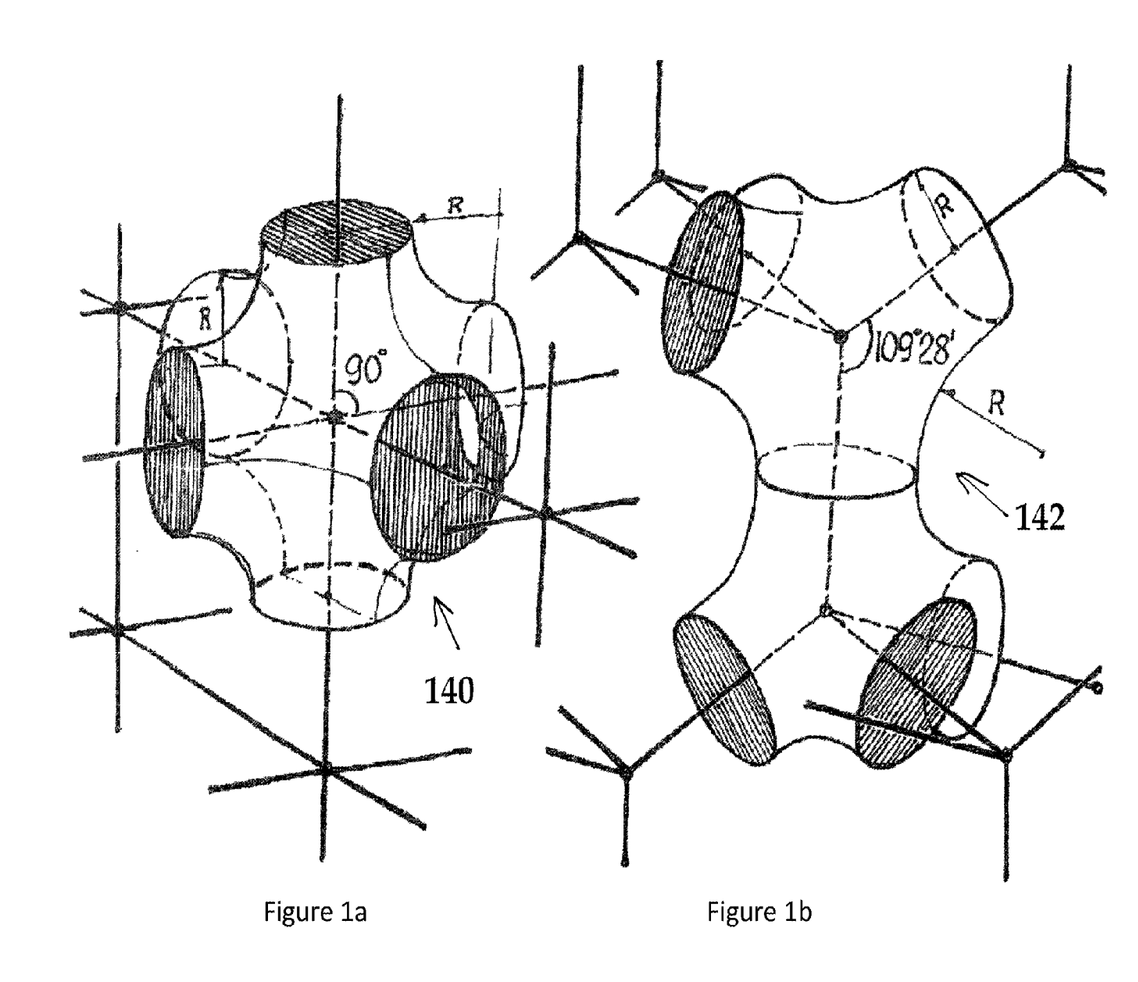
FIG. 1a illustrates a shell-surface that when joined with other such shells make together a continuous polyhyparic surface that subdivides space between two (identical) dual intertwined cubic networks (cubic symmetry regime).
FIG. 1b illustrates the shells that make together a continuous polyhyparic surface, that subdivides space between two identical (dual) 'diamond' networks.

In some embodiments the shells have a shape selected from the shapes shown in FIG. 1a, FIG. 1b and combinations thereof.

The thickness of the shells structure generally corresponds to the type of the material the shells are made of: in the case of reinforced concrete (of contemporary performance) 7 to 20 cm, while in the case of steel or other metal or composite material shells, few millimeters may suffice.

The edge of each box circumscribing a cubic unit, or a periodic shell unit, is
between 1.0 and 12.0 meters. The higher the genus value of the associated surface, the shorter the polyhedral edge size.

In some breakwater embodiments a portion of the shells is sealed, and some allow filling of air for floatability.

Resistance against corrosion may be attained by employing a plurality of methods, such as surface glazing, spraying with plastic materials, employing cathodic protection of metallic reinforcement ingredients, etc.

A portion of the shells and the sea water enveloped by it may comprise ballast material, adding to the overall stability of the structure.

The sponge breakwater may further comprise anchoring devices of any kind.

According to another aspect, a mould configured to allow producing thereof concrete polyhyparic shell is provided. The moulds may be made of steel or concrete or pretensioned fabric membranes for example.

In some embodiments a cubic tunnel system is oriented at about 45° to the direction of wave frontages.

The sponge breakwater may further comprise reinforcements and stiffening devices, such as: beams, plates, rings, cables, opening cage stiffeners and combinations thereof.

The sponge breakwater may further comprise within the tunnel front openings wave turbines for harnessing the wave energy for exploitation.

According to another aspect, a method of manufacturing a sponge breakwater mega-block at a concrete fabrication coastal plant in the sea is provided, comprising:
a protected calm water zone, as part of the manufacturing plant, with 'shipyard' facilities; with moulds, each configured to allow producing (by casting) thereof: a concrete polyhyparic (or minimal) surface shells and curing them; assembling the curved shell 'brick modules' or a supporting-removable platform and finishing the assembly of the mega-blocks after their being solved for floatation, and then towing the floating mega-blocks together into a continuous breakwater mass; and essentially immobilizing founding-anchoring it.

The breakwaters may be positioned and solved (depends on the bathymetric conditions and water depth) as either:
ground attached (resting on the sea bed), secured with ballast or foundations or both;

pile supported, if in deeper waters, or floating and anchored, if desired, or when pile-supporting is incompatible.

The manufacturing shipyard plant's protected water zone may comprise a sand (rock) bar, or a caisson wall or a sponge breakwater or combinations thereof.

The assembly and joining of the sponge breakwater mega-blocks in the manufacturing plant may depend on the shell material technology.

The joining of the polyhyparic concrete 'brick' shell's may be achieved by plurality of detailed solutions as are familiar in concrete pre-fabrication technology or by casting or riveting or bracing or post tensioning, or gluing or soldering or welding techniques as required by the fabricated shell materials.

The joining of the sponge mega-blocks into solid continuance, can be based on any of the above specified solutions, or with special bracing or post-tensioning devices or with prefabricated inter connecting sleeves from a plurality of materials designed to join the circular edge features of every adjacent mega-blocks together.

The joining of the sponge mega-blocks, may be performed considering preserving certain residual flexibility between the mega-blocks, to be accommodated by a plurality of detailed solutions. Such flexibility may be desired in order to reduce internal stresses or when considering in advance the relocation of the breakwater segments in the foreseeable future.

Although the primary motivation for the invention originates from the desire to elegantly dissipate the energy of water-waves, it is stressed that essentially similar structures could be utilized for dissipating other types of wave-induced energy, such as acoustic barriers and heat exchangers. These other uses are also claimed herein; however, as by way of example, most of the detailed description will relate to breakwaters.

Therefore, according to another aspect, a structure comprising polyhyparic shells, wherein the structure is selected from a group consisting of: sound-absorbers and acoustic barriers suitable for indoor and outdoor use is provided.

According to yet another aspect, heat absorbers comprising dual-intertwined polyhyparic shells are provided. Different agents, in the form of liquid or gas, may transfer heat to each other, or absorb heat from each other, without mixing.

DETAILED DESCRIPTION

General Description

Some embodiments deal with breakwater structures designed to oppose wave energy and to generate a protected-calm water zone for various activities.

The prevailing-conventional breakwater solutions are based on mobilization and employment of large quantities of material-mass dredged-excavated-quarried from nature or their synthetic equivalents, to generate the required resistance, mostly by reflection, to the actions of the pounding waves.

The permeable sponge breakwater represents an alternative approach. The basic departure from the conventional approach is in the fact that the sponge breakwater owes its energy attenuation performance to its spatial characteristics, meaning to the manner its structural material is distributed in space, rather than to the employment of mass-based fill-material solution strategies.

The geometry of the permeable sponge breakwater is generally representing a continuous periodic sponge surface which subdivides space between two dual (complementary) space networks (or lattices). Such periodic surfaces may be solved as mathematically minimal surfaces, and in a limited number of cases (because of the prevailing symmetry constraints) as continuous, smooth polyhyparic surfaces, meaning tiled-mapped with one and the same hyperbolic-paraboloidal surface units. While the structural performance of the minimal and the polyhyparic surfaces is practically the same, the polyhyparic geometry is simpler to realize when it comes to mould fabrication.

Various periodic hyperbolical-labyrinthine (or infinite polyhedral) surfaces are envelopes solved as geometric sponge-like configurations (even if not perfect), although some configurations are preferable. Their main characteristic is their sponge-like porosity—permeability which may manifest itself in a variety of specific geometric solutions.

The energy attenuation is achieved mainly through absorption rather than reflection because of the generated turbulence/friction by the waves bursting into the interior of the sponge breakwater tunnel system. Laboratory tests have demonstrated that about 80% of the wave energy is absorbed, about 10% reflected back and about 10% penetrates.

The sponge breakwater may be realized as a solid, thin shell structure in a variety of material solutions, ranging from steel or plastic shells or reinforced concrete shells of various thicknesses, according to their spatial disposition within the breakwaters' cross-section; the closer to the breakwaters' front, the thicker-stronger they are. When all accounted for, the overall amount of concrete in the shell material mass amounts to just about 10% of the concrete used in conventional fill-material based solutions, and only about 3% of the total volume of solid materials (including rocks, earth etc.). The permeable sponge breakwater, due to its high geometric periodicity, may be highly industrialized, wherein one type of (shell) suffices for its entire composition.

The permeable sponge breakwater may be structured to allow staged completion, starting with the fabrication (by casting) of the unit shells followed by their assembly into solid mega-blocks, and most preferably the mega-blocks are configured for floatability and transportability (by sea) to the destination site, for joining-bracing them together and for ground attachment or pile supporting or anchoring-mooring (depending on the water depth) to function as a completed breakwater.

Permeable sponge breakwaters thus provided, that are not based on fill-materials mined from nature, are environment-friendly. The permeable sponge breakwaters are made of repeated modular (e.g. reinforced concrete) shells based on continuous hyperbolic surface geometry. The shell modules may be assembled-joined into monolithic array mega-blocks, which together with the seawater filling them (and the foundation-anchorage provided) may pose a frontal resistance of more than 3000 tons per meter along the breakwater's front length. Test experiments demonstrated that most of the wave energy will be absorbed in the permeable sponge-like labyrinths of the shells, which will act as a wave energy attenuator by prolonged breaking of the wave's momentum through the repeated turbulence and resonance action of the bursting wave mass.

The economic-engineering advantage of this kind of breakwater may increase with sea depth, especially when compared with conventional breakwaters.

According to one aspect, a poly-hyperbolic-parabolic (polyhyparic) shell, comprising reinforced concrete or any other suitable material, is provided.

According to another aspect, a rigid shell structure comprising a plurality of sponge like permeable shell structure elements is provided.

According to yet another aspect, a mold configured to allow casting-producing thereof a concrete polyhyparic shell is provided.

Morphology

A great number of possible geometries have been considered out of different continuous periodic hyperbolic surfaces. At the final comparative test, two alternatives were selected for further investigation:

A. Shells (140 in FIG. 1*b*)) making together a continuous polyhyparic surface that subdivides space between two identical dual intertwined cubic networks (cubic symmetry regime)

B. Shells (142 in FIG. 1*b*) making together a continuous polyhyparic surface, that subdivides space between two identical (dual) 'diamond' networks.

Both surfaces are doubly-curved (saddle-shaped) at all of their points, slightly different from the minimal surface (as mathematically determined) and therefore with similar structural performance.

Figure 2:
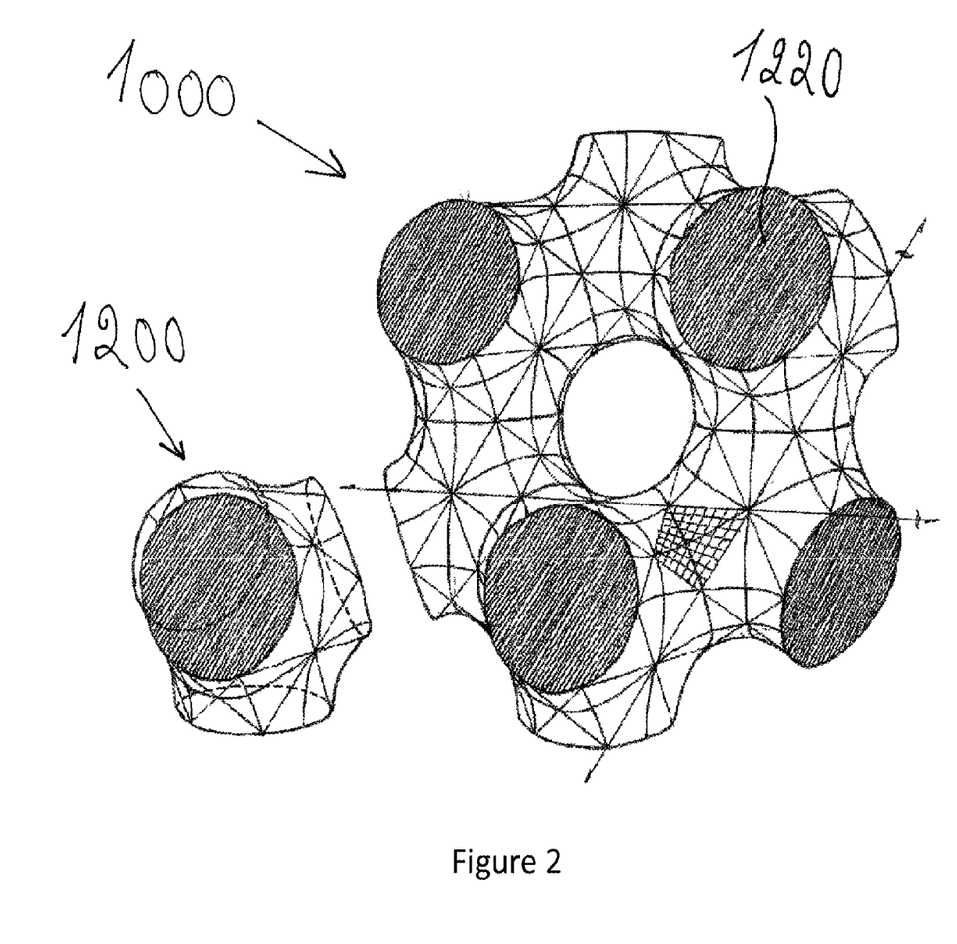
FIG. 2 shows a structure embodiment of shells of a repetitive, diamond network's symmetry nature.

Thus, in some embodiments, breakwaters or other structures, the shells are arranged periodically-symmetrically, in repeat units, such as a structure 1000 of shells 1200 shown in FIG. 2 (one shell 1200 is isolated). Each array of multiple units provides a complimentary bi-tunnel system 1220 that forms together with adjacent shells a 'diamond' (in the embodiment) or 'cubic' network of tunnels.

The structure differs in a basic feature represented by the tunnel's networks: the cubic network is based on straight and continuous tunnel axes, while the diamond network is characterized by tunnels arranged in a zigzag array.

The choice of two hyperbolic alternatives, over other specific surfaces, was influenced by a number of properties and qualities of the two surfaces selected, for example:

1. Experience with the geometry of the two surfaces, their symmetry and the variety of elementary units derived therefrom, which led to the suggestion that the surfaces would be suitable candidates, and
2. The capacity of transforming these hyperbolic surfaces into polyhyparic ones, i.e., surfaces composed of hyparic surface units, maintaining continuity and smoothness along seam lines. Polyhyparic surfaces are relatively simple for fabrication, because they simplify geometric definition and simplify shells' production problems in real scale, as well as in reduced scale for model fabrication and for tests in a wave channel.

Figure 3A:
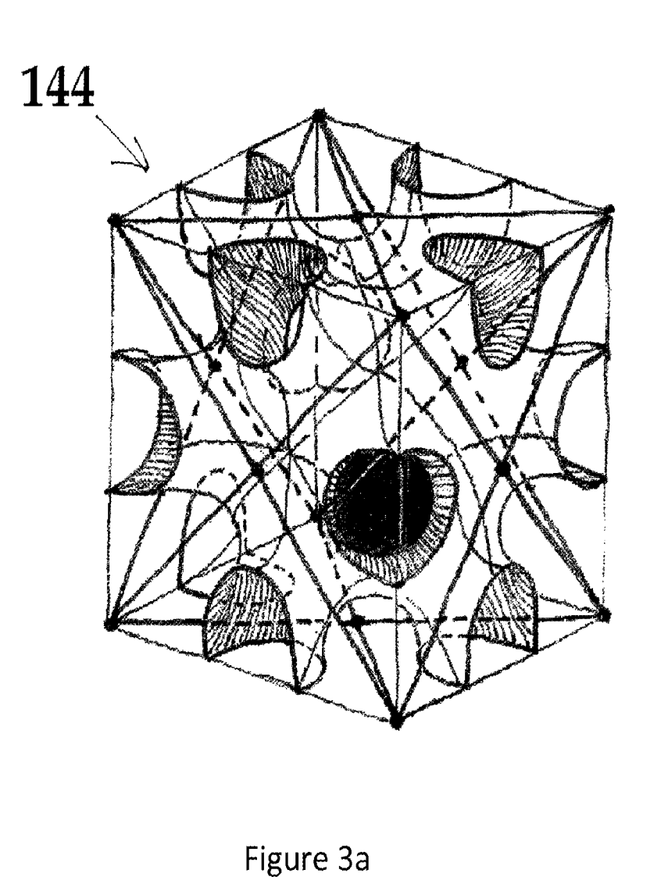
FIG. 3a shows an embodiment for a cube-centred and face centred network.
Figure 3B:
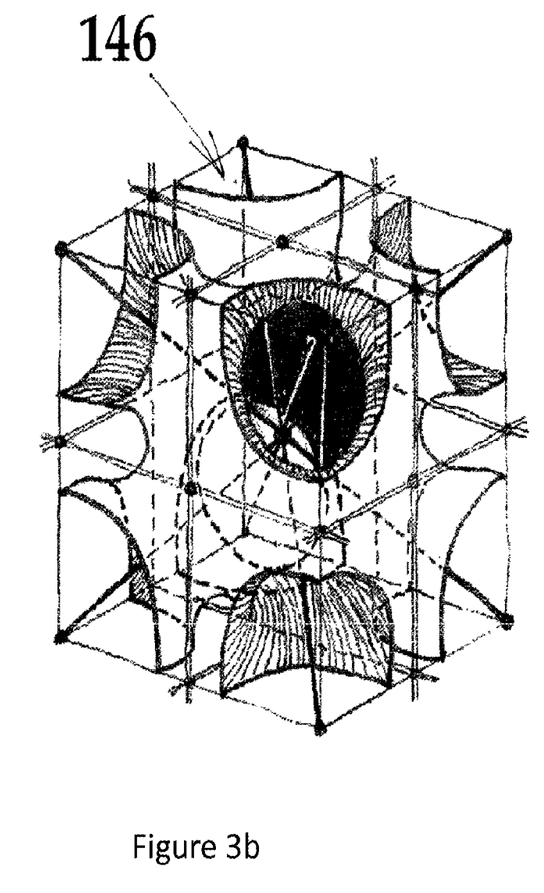
FIG. 3b shows another embodiment for an edge-centred and face-centred network network.
Figure 4:
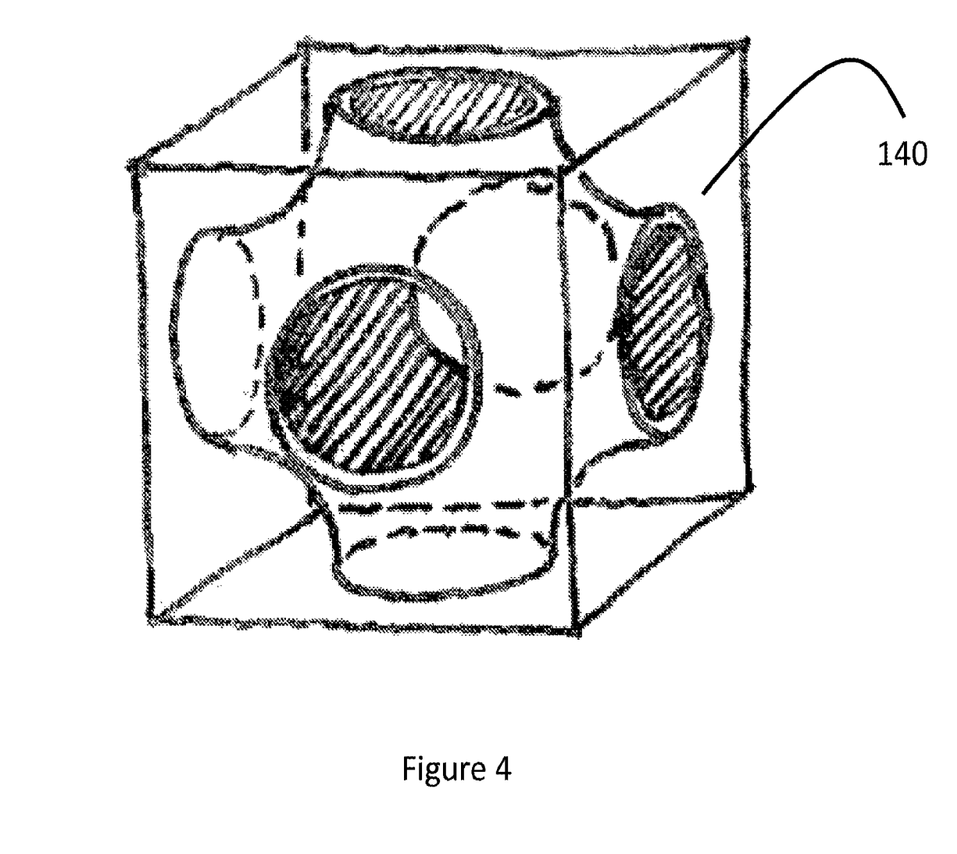
FIG. 4, shows a symmetry element embodiment for cubic networks.

Both surfaces, by manipulation of their symmetry elements, can be divided into modular units in a number of manners. See for example FIGS. 3*a* and 3*b*, showing two different non-hyperbolic elements units 144, 146 (that divide space into two non-identical networks and a hyperbolic partition does not contain any twofold symmetry axes, thus polyhyparic surfaces are not possible), and the orthogonal arrangement in FIG. 4 shows an element 140 for cubic networks, which is a hyperbolic surface subdividing space between two dual cubic networks.

The orthogonality is convenient (and significant) in relation with the organizational needs of the production site that will contain tens to hundreds of moulds, complex storage for the shells and transportation arrays with many crossing traffic and transportation tracks. The hyperbolic shape is important for simple design of the molds.

Figure 5:
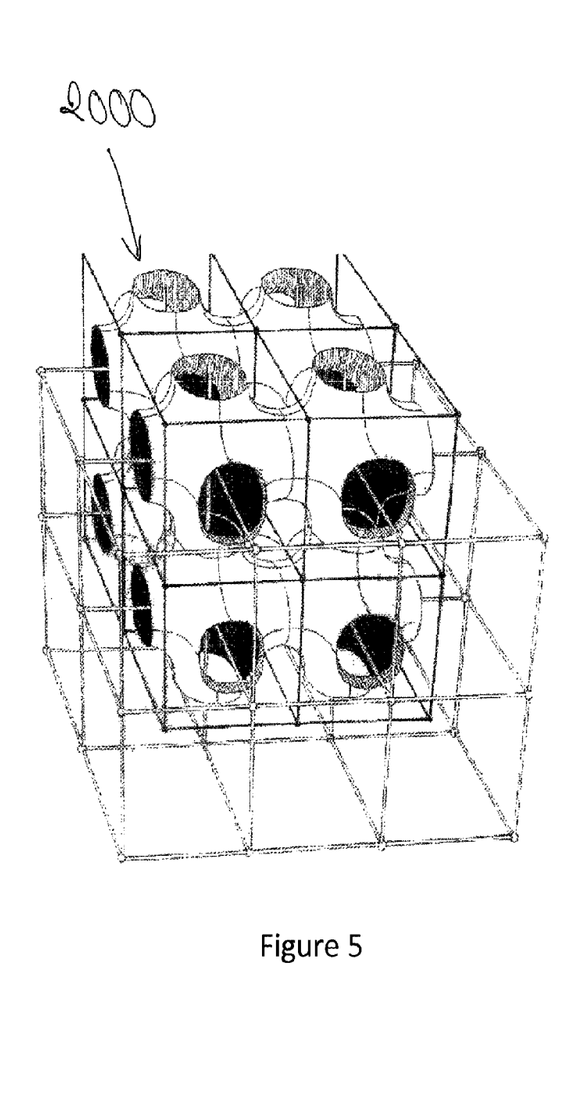
FIG. 5 shows a cubic lattice of tunnels embodiment.

For the purposes of the first series of tests, the hyperbolic cubic surface was selected to make a cubic lattice of tunnels, for example a structure 2000 in FIG. 5, and that was mainly considering comfortable production of models and moulds; the curvature values in the surface's critical areas; the capability of the modular units to be combined into large orthogonal building blocks; and the nature of their curved edges that can be easily reinforced and provide more rigidity against the storming waves.

The 'cubic surface' permits setting up the modular units according to two different orientations:

A. The orthogonal orientation that preserves parallelism in the direction of the wave frontage (and also, more or less, with the coast line).

B. The tunnel networks axes are positioned 45 degrees towards the direction of the waves' frontage.

The orientation, when rotated by 45 degrees may be preferred since the length of the tunnels where waves will break and swirl is longer (by square root) than in the orthogonal orientation.

Obviously, this choice has implications on the breakwater hydrodynamic behaviour and it is plausible that the amount of reflected energy will be larger, and, on the other (rear) side of the breakwater the passing through energy will be lesser.

The possibility of applying infinite polyhedral arrays of the $D-6^4_2$ [meaning: diamond tunnel network (connectivity–genus=2) made of plain hexagons; 4 hexagons around each vertex] and $C-4^6_3$ [meaning: cubic tunnel network (connectivity–genus=3), made of plain squares; 6 squares around each vertex] types, referring to the diamond and the cubic tunnel systems and their symmetry was considered. It would seem that versus a similar dimension of the modular unit size, the surface of the doubly curved hyperbolic units, as well as the size of extreme loadings (forces and stresses on the arrays) will be smaller, and therefore they are more efficient in respect of waves' energy attenuation.

In addition, utilization of these polyhedral geometries can considerably simplify the moulds fabrication for manufacture of the shell modules.

In some embodiments, polyhedral concrete units may be constructed from hexagonal plates for example, thus considerably simplifying the casting and stacking of finished modules.

In this case, as result of the geometric modification, the modular units also stack more tightly, which certainly has (positive) implications on the size of the production site and its space utilization.

Construction Criteria

Figure 6A:
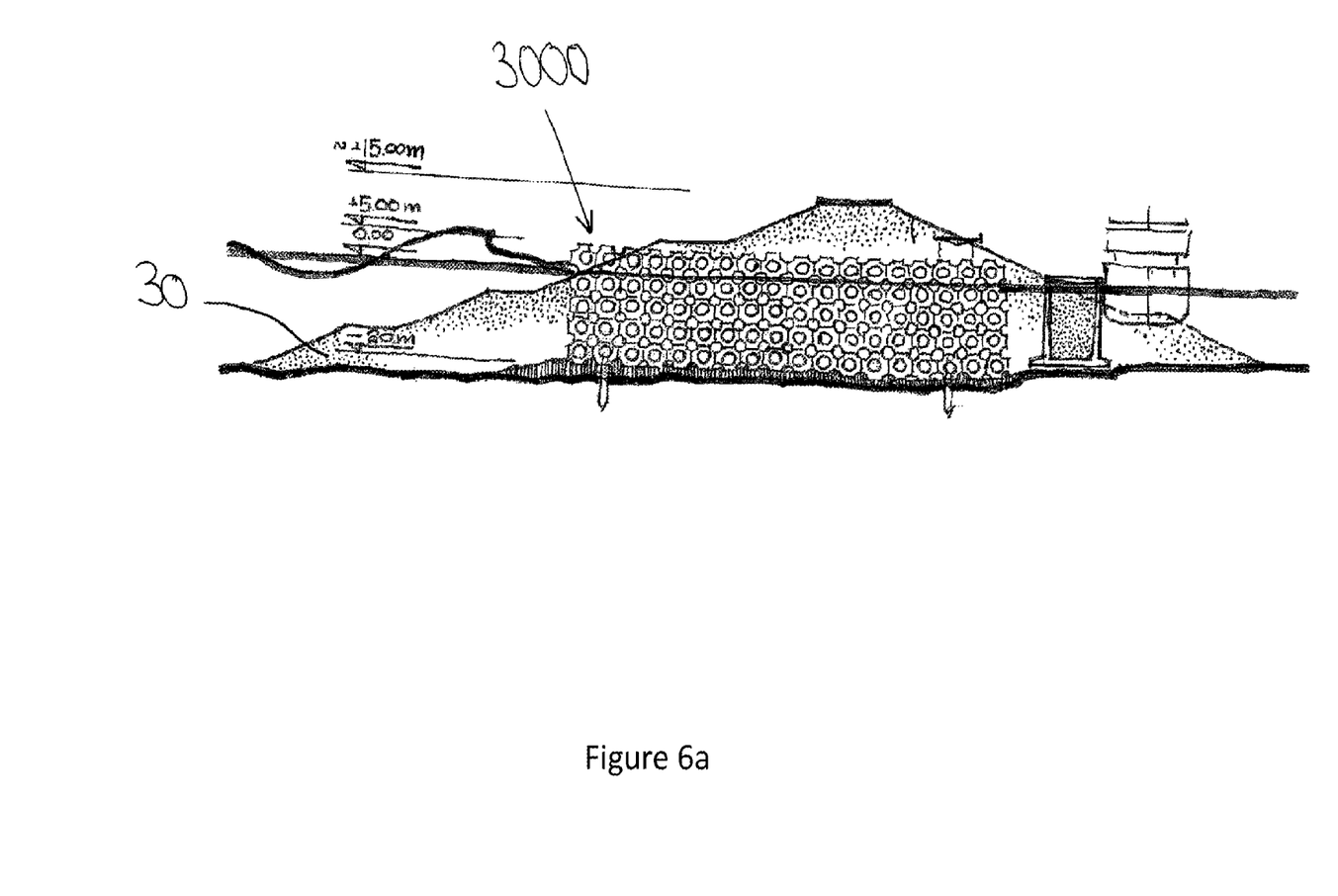
FIG. 6a shows an orthogonal building mega-block for a breakwater embodiment, based on the cubic networks.
Figure 6B:
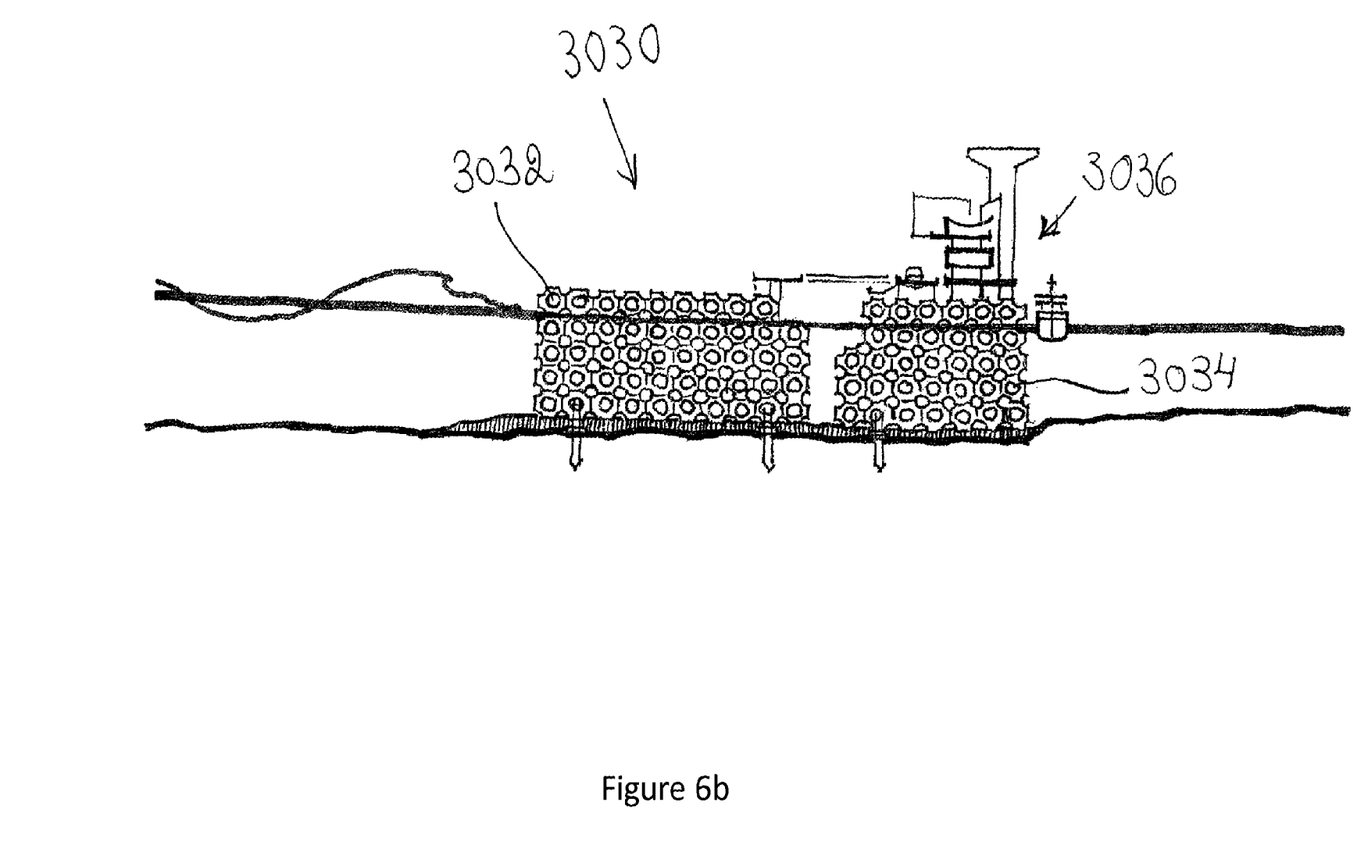
FIG. 6b depicts a split breakwater embodiment, with the front built and engineered for receiving the initial impact of the waves mass and a rear side, at a distance of several tens of meters towards the shore.

The breakwaters' shape in a cross-section parallel to the waves' advance direction raises various possibilities. Referring to FIGS. 6a and 6b, two principal alternatives were examined.

A. An orthogonal building block 3000
B. A split breakwater (3030) with the front (3032) built and engineered for receiving the initial impact of the waves mass and a rear side (3034), at a distance of several tens of meters towards the shore, dispersing at least some of the residual energy and fulfilling additional duties of carrying out useful coastal functions (3036).

The FIG. 6a also shows the traditional breakwater 30, that is less effective in attenuating wave energy and thus has to be higher to cope with waves up to certain heights. The wave crests build up when they encounter the prior-art barrier and thus the breakwater 30 is required to attain a certain regulatory height about the water surface to exhaust the wave's kinetic energy. The added height considerably increases the mass of the prior art breakwater. The novel building block 3000 does not require such extra height and thus even more material is saved.

There is no doubt that from the point of view of resistance to horizontal forces alternative "a" is preferable. Splitting the breakwater reduces the resistance of breakwater's front to these forces and will probably require relying on complementary anchoring-founding (3037) to essentially immobilize the breakwater.

On the other hand, the breakwater's rear side is free of the strong waves' impacts, and therefore it will be possible to utilize it as a construction carrying platform (if programmatically desired) for various services (3036).

Both structures have their advantages, and thus mostly programmatic imperatives will prevail.

The Size of the Modular Unit

The size of the modular unit will tend to attain an optimal shell in the strength required for resisting the wave and production effectiveness aspects (moulds and production rate considerations). The following parameters seem to be of importance:

A. Considering the example of shells made of concrete, a dominant parameter in establishing the structural effectiveness is the shell's curvature radii 111, which can be expressed as a function of the radius at the shell unit's circular cross section and the size of a modular unit's edge, a (120 in FIG. 7), considering a modular cube circumscribing the polyhyparic unit. A radius-r (110 in FIG. 5) of 1 to 2 m of the hyperbolic shell, at the unit's circular cross section, seems most plausible.

B. Another important parameter is n, the ratio between the shell's thickness t (130 in FIG. 7) and the size of a modular unit's edge a (120), n=t/a.

The area of the hyperbolic (or polyhyparic) unit of the modular unit (the basic displacement unit) of the cubic surface is $s=2{,}36617 \cdot a^2$ (e.g.: if a=5 m, then $s=59{,}15425 \ m^2$).

Where the thickness of a concrete shell is $t=n\cdot a$, its volume may be calculated as follows:

$$v=2{,}36617 \ a^2 t=2{,}36617\cdot n\cdot a^3.$$

The relative volume of the material requires constructing a cubic unit volume of the overall structure in percents with a volume=$2{,}26617\cdot n\cdot a^3 \cdot 100/a^3 \cong 2{,}36617\cdot n$.

Regarding different values of n, the volume in percent is expressed in table 1.

TABLE 1

| n | volume (%) |
|---|---|
| 0.01 | 2,366 |
| 0.02 | 4,732 |
| 0.03 | 7,098 |
| 0.04 | 9,464 |
| 0.05 | 11,830 |

Therefore, a 12 cm thick concrete shell in a modular cube, the edge of which is
a=6.0 m (n=0.02), will have a volume in percents of v=236,617·0.02=4.732% and its volume will be:

$$V=2{,}36617\cdot 0.02\cdot 6 \cong 10.222 \ m^3$$

Hence we may say that the larger the edge of the circumscribing cube unit and with shell's thickness remaining unchanged, the smaller the shell's relative volume (concrete saving). On the other hand, as the measure of the shell's curvature decreases, and as a result the required reinforcement increases.

The shell's thickness may further be reduced if the concrete compositions include main reinforcement meshes/fibres (preferably non-corrodable) instead of the conventional steel-based reinforcement meshes.

The size considerations are further discussed in sections below.

Considerations Regarding the Production Process and the Transportation and Assembly Logistics of the Permeable Sponge Breakwater There are multiple alternatives for fabricating and assembling the repetitive 'blocks' of the breakwater, for their transport to their 'functioning site' and for the matching—assembly of the complete breakwater on-site.

Many of the production and assembly decisions stem from the breakwater's planned size and constraints of its construction rate. For example, considering typical factual circumstances at an Israeli Mediterranean coast:

A. The resources and means required for a single project providing protection to an artificial island of ~2 km² that has on its western end a water depth of 20-22 meters.

B. Assuming modular units of shells having a 5·5·5 m size at an average depth of 17 m, about 60,000 (±) modular units are required.

C. A 10·10 m mould permits, in the course of one casting session producing 4 modular unit halves. According to a preferred embodiment, the shells' thickness is 10±3 cm. The shell's weight upon its extraction from the mould is approximately 23 tons. In some embodiments, an industrial plant for manufacturing the permeable sponge breakwater at a selected adjacent site of shore is provided.

Figure 7:
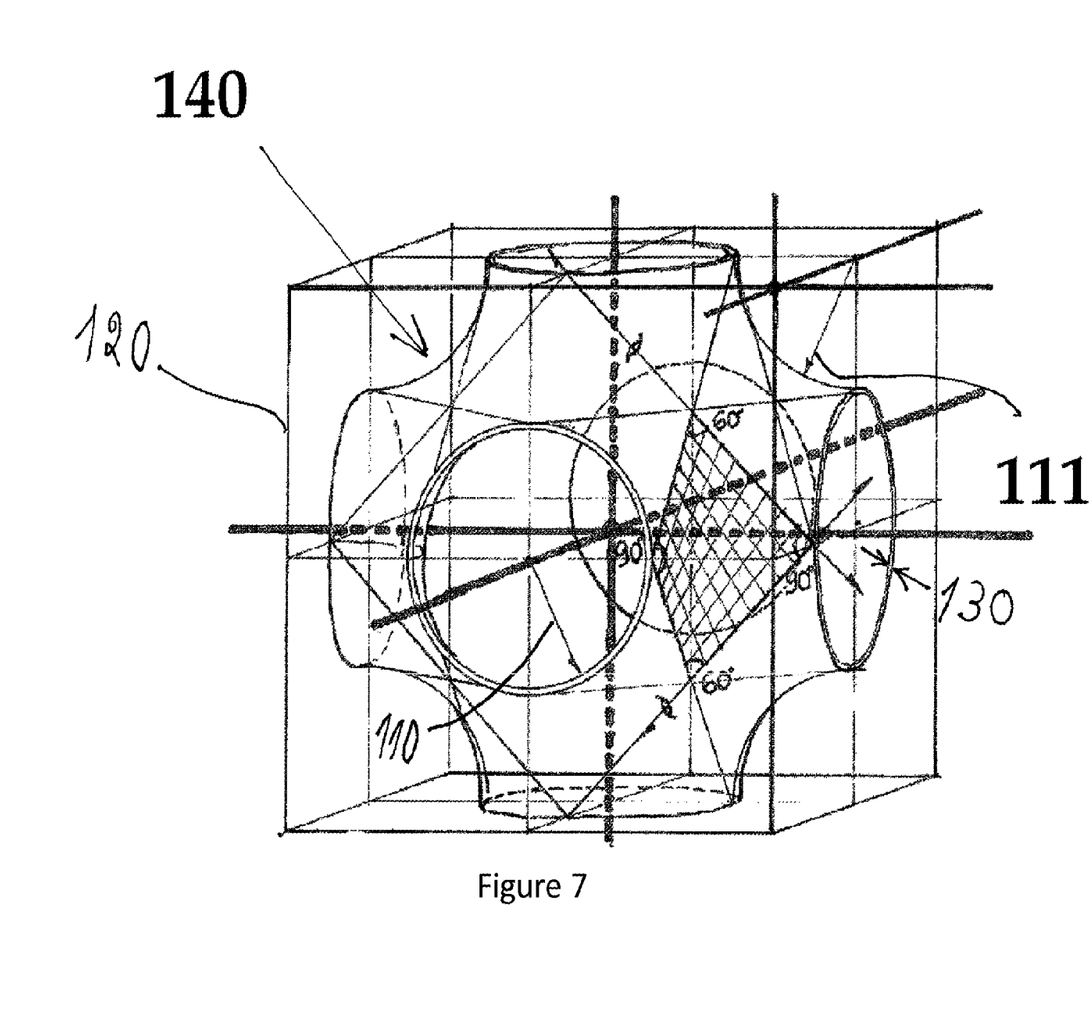
FIG. 7 shows a modular unit for cubic network shells like the symmetry element in FIG. 4, illustrating the periodic polyhyparic geometry of the shell structure.
Figure 8:
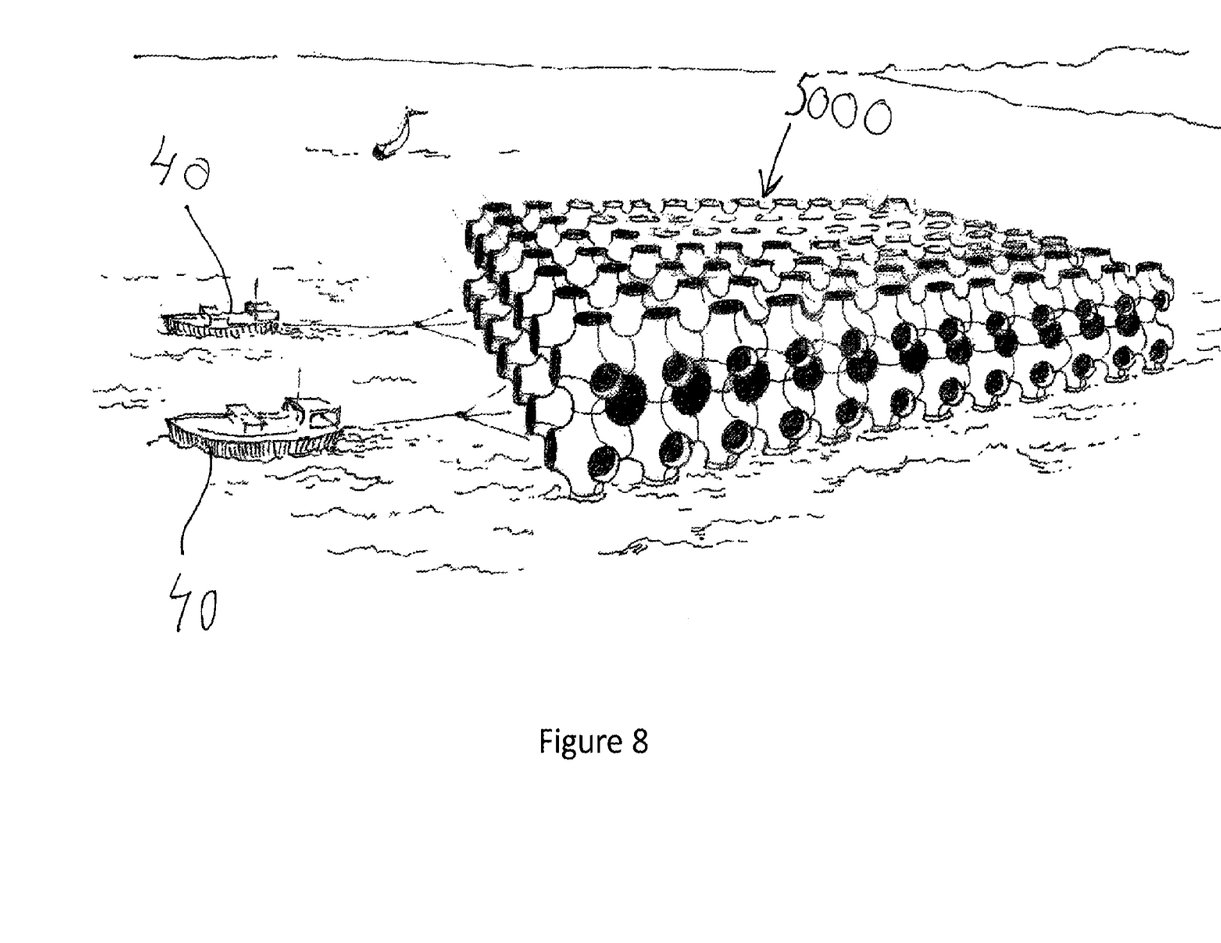
FIG. 8 demonstrates transporting floating mega-blocks by towing them with the aid of towboats.

D. Building a suitable breakwater may comprise the following main stages:

1. The shipyard-like production plant has to have a protected water-zone and a precast concrete plant, with moulds, cranes, concrete mixing and casting plant, curing and stacking yards, etc.
2. As shown in FIG. 7, The shipyard-like assembly plant 4000, with its protected water zone, will facilitate convenient assembly of a mega-block made of multiple "component bricks", mutually attached and joined to form the largest towable "mega blocks".
3. The shipyard-like assembly-plant should have sufficient water depth to allow for the mega block's draught for floatability and for towing away.
4. As shown in FIG. 8, transporting the floating mega-blocks 5000 by towing them with the aid of towboats 40 to their final site (not shown).
5. Stage-completion assembly process of the 'mega-blocks' by joining and fixing them on site, to form an integrated, rigid, stabilized conglomerate breakwater.

E. The development of breakwater protected artificial islands involves a whole complex of production facilities of which the breakwater is only one, though very important, part. The partial numerical examples given here are meant to visualize the sheer magnitude of such undertakings which should spread over several decades as an on-going development process.

The Functional Level

1. Various permeable sponge breakwater embodiments span a very versatile functional performance range, in all bathymetric conditions as may arise, with varying depth characteristics, ranging from a depth of just few meters to that of hundreds of meters deep. Since most of the wave energy is concentrated in the upper 20-25 m sea layer (as in the example of the Israeli coastal sea expanses), the sponge breakwater will cover (protect) that depth while protruding above the sea level by just 5 m (on average); this ensures energy attenuation of waves reaching to a height of 10 to 14 m.
2. For this eventuality the breakwaters mass could rest on the sea bed (ground-attached and founded) for depth conditions of 7 to 25 m, or on supporting piles for depth conditions of 20 to 35 m, or perform as a floating-moored breakwater for depths greater than 30 to 40 m.
3. The floatability of the sponge breakwater may be generated by sealing some of the lower shell modules (and pumping air into their interior) or by providing pneumatically inflatable balloons within their interior and so forth. It may be asserted that using such inflating technology the sponge breakwaters can be solved for re-floating if such a demand is part of its design performance specifications (taking into consideration a change in its location or layout).
4. Permeable sponge breakwaters act to return a relatively small portion of the waves' energy (just ~10%) thereby significantly reducing the forces and loads on the structure. Most of the wave's energy (about 80%) is absorbed inside the structure (due to turbulence action within the tunnel's interior). A very small portion of the wave's energy passes through, and flows out of the structure's rear (about 10%). The relation between the reflected-absorbed-penetrating energy fractions is a function of the structures' dimensions and the geometry of its cross-section; the characteristics of its hyperbolic surface; the dimensions of the modular units size and the resulting curvatures; the orientation of the structure's tunnels relative to the wave frontage and so forth; and, of course, the hydrodynamics of the wave regime (height, period, etc.).
5. The relative volume of the sponge breakwater as figured from its cross-section, is significantly smaller than that of a conventional breakwater, a relative advantage that increases with the increase of the sea depth at the site, until a depth is reached beyond which a conventional breakwater (fill material based) becomes completely impractical (beyond the depth of 20 to 25 m or so).
6. By partial filling of the breakwater's interior volumes with air, thus displacing the ballast water, the locus of its gravity center may be altered, and thus controlled, providing for stability during towing-sailing or while functioning as a floating breakwater, and support carrying platform for various services, if desired.
7. The sponge breakwater may be incrementally altered, by addition of thickness-weight-strength or by addition of modules, shell bricks, to alter and adjust to developing demands (especially when re-located).
8. The sponge breakwater segments that cease operating as a breakwater can be adapted, through minimal investment, to other functions, such as construction and support platform, or as a storage tank, or as both.
9. By permitting some (even considerably reduced) wave energy penetration through the breakwater, refreshing action is achieved, and water stagnation (in the protected zone) is avoided, thus contributing to its environmental quality and friendliness.
10. In some situations, when the sponge breakwater is ground attached, some of the blocks can be converted into fill-material tanks, thereby increasing its mass and improving the breakwaters stability, and thus reducing the need of anchoring-founding down to complete annulment. Only part of the sponge breakwater's volume may be filled for its stabilization, so as not to impair its hydrodynamic behavior and function.
11. The modular hyperbolic sponge shell structure, when not functioning as a breakwater, may be used for storage of various articles or materials and as a platform with vertical seawalls, with horizontal piers and built volumes above the piers, for a plurality of functions, while being ground attached or pile-supported or floating and anchored.
12. The permeable sponge breakwater can serve as a sea reef and habitat for a variety of fish (and other sea-flora and fauna) populations or as a marine farm in the context of aqua culture.
13. The permeable sponge breakwater can be built as a "split" structure with a front side that absorbs most of the wave energy impact, and a rear side serving as a 'support platform' for various urban functions. This arrangement keeps away the spray of the striking waves from the rear developed urban array and prevents the shocks and shudders from reaching the hind structures.
14. The height of the permeable breakwater and its top elevation above the sea level is considerably lower than that of the conventional breakwater 30 (FIG. 6), thereby reducing obstruction of the horizons feature of the line view.

Structural Quality

1. The most fundamental insight and assumption in the field of the design of space structures is that their structural performance effectiveness stems not from the amount of their invested material or its kind but rather from the way it is distributed in space. The main structural feature of the breakwater geometry embodiments is its minimal or polyhyparic surface double curvature at all points of its continuous shell area. The overall structure, as previously specified, is of a periodic (modular) hyperbolic surface, with curvature values that can be manipulated and controlled by setting the dimensions of the basic modular unit only.

2. The nature of hydrodynamic loads and forces is that they act simultaneously on the whole envelope of the breakwater structure (in contrast to fixed, concentrated point-wise loads and forces) and shift continuously so as to produce fluctuating patterns of stresses throughout the interior of the shell's mass. The curvature of the shell's surface, continuity and smoothness influence its structural behavior and efficiency in terms of material and reinforcement investment, and eventually, its cost-effectiveness. The entire structure array of the breakwater can be strengthened with reinforcements, mostly at the frontal sectors, those subject to maximum waves impact or those subjected to high loads of built volumes above, as the programmatic dispositions may require, by adding beams, plates and shell wall stiffeners so as to make them resistant to extremely powerful sea waves. The breakwater can be strengthened by pre-tension cables embedded in the shell's material or externally along the tunnel axes or otherwise: when embedded, the straight pre-tensioning cables may develop along straight lines in the surface geometries which include 2-fold rotation symmetry axes (and subdivide space into two identical intertwined tunnel systems). Length-wise dimensioning, course twists, cross-section (height, width) and shell units strength (shell thickness, reinforcement) along its entire composition can be completely regulated to conform with the requirements of a design program and of a local site's characteristics.

Production, Assembly and Set Up Logistics

The high periodicity level of the sponge breakwater due to its symmetric characteristics and the resulting modularity of its shell geometry, allows for a very intensive industrialization process and fabrication of its shell components and their assembly.

The elementary repeat unit of the hyperbolic shell surface or its various approximations and derivatives ("infinite polyhedral" plate structures, cylinder segments, composition structures, etc.) may have a perimeter composed of curved or plain segments and the overall shell surface may assume different mathematical definitions among which is also the distinctive polyhyparic surface, which is relatively easy to fabricate because of its ruled surface characteristics.

The geometry of the mould's surface can be modified to meet many constraints, in the aspect of its size, (itself a function of the lifting equipment and their transportation mode), the materials the mould is made of, the materials of the manufactured products and their application methods, the shells' dismantling and their stacking or curing (from concrete derivatives) for storage purposes.

The assembling-joining of the manufactured shell units to one another can be based on various complying methods for wet joints, such as casting, gluing, soldering, and for dry joints, by means of braces, clamps, thread riveting and all sorts of socket-plug solutions, including pre-tensioning by cables along the straight axes of the symmetry lines of the surface manifold or its tunnel systems, all dependent on the shell's choice of materials and fabrication technique.

Given that the hyperbolic surface can be solved as a membrane subjected to tension only, it is possible to engineer moulds from pre-tensioned spatial fabric membranes. Their advantage resides in the simplicity of their manufacture, their light weight and their foldability for transportation and storage purposes. They can be "peeled" off the cast shell in a fast and simple operation, without having to jolt the shell. Early exposure of the shell may improve and accelerate the curing process of the shell's concrete.

Since it is possible to solve the hyperbolic shells' structure for flotation, most assembling operations can be carried out on water (provided that the depth conditions suit the structures draught).

The shells can be engineered in different casting or spraying methods and in various thicknesses. This may be accomplished with a variety of materials, both in the aspect of the matrix as well as in that of the reinforcement matrices, such as shotcrete, concrete reinforced with metal or plastic fiber (fiber reinforced concrete), and industrial meshes to fabricate ferrocement or ferrocement-like shells. Concrete shells may be covered with an epoxy or similar material that coats the surfaces and may enter cracks in the concrete. The epoxy may increase the lifespan of the breakwater.

Execution Phases of the Sponge Breakwater

Figure 9:
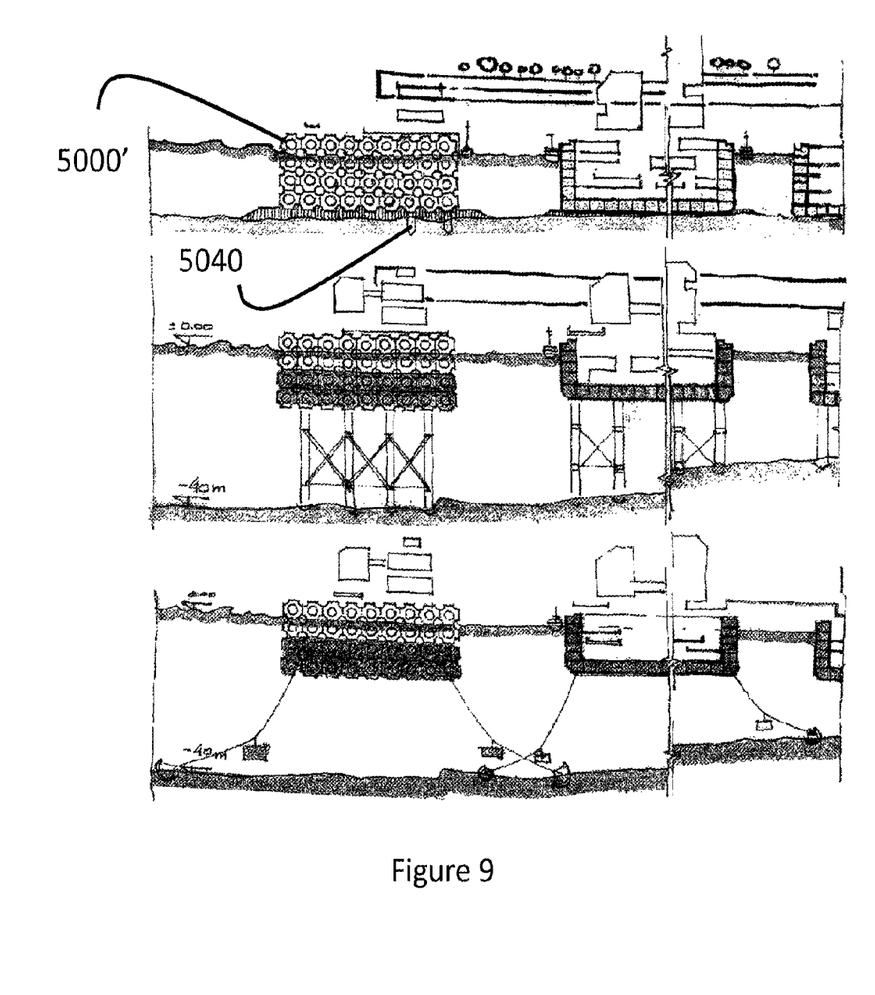
In FIG. 9 mega-blocks are joined and the sponge breakwater is shown at its final location, stabilized by grounding or pile-supporting or anchoring.

The principal execution phases of the sponge breakwater are the following:

1. Manufacturing the shell unit bricks
2. Assembling and joining the bricks into floating mega blocks
3. Towing-transporting the mega-blocks to the intended operation site of the sponge breakwater
4. Joining the mega-blocks and constructing the sponge breakwater at its final location while providing for its stabilization by grounding or pile-supporting or anchoring it (depends on its location in relation to the local sea-bed) as schematically shown in FIG. 9.

On a higher resolution, every execution phase may be composed of few intermittent stages. For example, 1. Manufacturing of a "shell unit brick" may be preceded by constructing and facilitating a fabrication plant, and a shipyard facility with a protected operational water zone.

The nature of the fabrication plant and the required facilities may depend on the type of brick shells, their materials, overall weights and sizes, curing-hardening requirements and so forth.

The curing and the storage of the finished bricks may impose space requirements and special facilities.

2. Assembling and joining the bricks into floating mega-blocks may comprise three consecutive stages:
   Assembling and joining the first 2 to 3 layers of the mega-block while still on a supporting floating production platform (with a ground area of the mega-block).
   Providing for the floatability of the assembled array and releasing it from the supporting platform, to perform as a floating assembly ground.
   Continuance of the assembly process until its completion.
   The mega-block assembly may be followed while still in the "shipyard" plant area, with concomitant construction of adjacent facilities and complementary functional volumes.
3. Assembly of the mega blocks and joining them into one breakwater, as designed, may comprise:
   Executing all the required preparatory work on the site, its sea-bed ground manipulation, providing for all the foundation required for the pile supporting anchorage solutions, for the stabilization of the mega-block while in the phase of the assembly-joining operation.
   Delicate maneuvering and fixation of the block in relation to the already assembled conglomerate array.

Joining the mega-blocks (using one or more of the solutions and techniques described herein).

Joining all accessory components, on or within of mega-blocks structures into one continuance.

finalizing the stabilization of the sponge breakwater (foundation or pile-supporting or anchorage-moorings) operations, adding ballast materials, if desired, installing fenders, shock absorbers against moving ships that may come into contact with the breakwaters, edge walls and so forth.

The Geometrical Mathematical-Topologic Periodic Array, its Manipulation and Implementation for Defining the Repeat Unit of the Modular Shell Array According to one aspect, the permeable sponge breakwaters' surfaces may be defined as periodic hyperbolic surfaces. Some embodiments are derivatives of "infinite polyhedra":

The surfaces may be extended continuously in an ordered way while subdividing the enveloped space into two (or more) continuous sub-spaces, in the form of conjoined tunnel networks. These networks, in the case of division into two subspaces, are dual-complementary and can be mutually-reciprocally deduced from each other.

As topologic phenomena, the hyperbolic surfaces may be characterized more by their genus, valence and curvature characteristics than their symmetry definitions, although their symmetry regime is also of importance, defining the geometric periodicity—repetitiveness and the modular nature of the surface configuration.

The practical range of the genus values of the applied subject surfaces is: $2 \leq G \leq 13$, referring to resulting tunnel networks, with a valence of val.=6 (as pertaining to the cubic symmetry regime).

The repetitive sections of periodic surfaces, that do not contain symmetry elements except as part of their perimeter, can accept different geometric-mathematical definitions:

Minimal surfaces; polyhyparic surfaces, i.e., smooth composition sequences of hyparic segments; polyhedral surfaces, i.e., periodic polyhedra with plain faces (two only meeting at a bounding edge); or even discontinuous surfaces composed of combinations of cylindrical, convex and/or hyperhedral segments The subject of polyhedral envelopes is confined to the domain determined by: $\Sigma \alpha av$, average sum of the angles at the envelope's vertex, $2\pi \geq \Sigma \alpha av \leq \Sigma \alpha av \leq 4\pi$ and val.av—the average edge valency in a vertex, $3 \leq val.av \leq 12$.

One or more of the tunnel network systems may be transformed into a cellular configuration, thus dramatically strengthening the whole cell agglomeration and consequently leading to a single tunnel labyrinth and an increase in the amount of reflected energy.

Evidently, the volume of each of the subspace tunnels can be partially partitioned (with the integration of polygonal plain or curved surface segments) until an array of cellular compartments is obtained, to deal with various designs considered such as providing enclosed spaces for flotation and ballast or storage of various articles within the interior of the sponge breakwater.

The basic modular unit size (equivalent to the module's edge length) is practically confined to:

$1.0$ m$<a<12.0$ m.

Applications of the Sponge Breakwater Structure

1. The prime application of the permeable sponge breakwater is to perform as a breakwater and generate a protected-calm water zone for a plurality of goals. As previously described, the sponge breakwater achieves a wave energy attenuation of about 80% absorbance, about 10% reflection, permitting for penetration of the remaining 10% only.
2. Carrying (support) platforms for "green energy" production farms: wave turbines; wind turbines and solar energy harnessers, as well as marine agriculture, e.g., fish farms or marine facilities for public recreational activity.
3. Application for tank storage support structures of liquid, gas or bulk articles/materials, while performing as ground attached or pile supported or floating structures.
4. Application for a vertical sea-wall construction for supporting piers, ship berths and platforms capable of supporting built habitable volumes and their servicing facilities. The interior of the sponge structure may be filled with sand-earth ballast materials and/or used for underground infrastructures.
5. The assembled units can be solved for flotation (sealing part of the lower-interior modules and filling them with air) and sea-transporting them to the site from the coastal plant, thus providing a significant relief to the terrestrial transport systems and critical reduction of transportation costs.
6. The breakwater may be assembled on-site, based on the sea bed (ground attached) or pile supported or floating and anchored, conforming to the local bathymetric conditions.
7. Referring again to FIG. 9, the top structure 5000' is anchored with stakes 5040 interspersed in the structure 5000'. The stakes 5040 are typically inserted from above the structure 5000', preferably through the channels (not shown) in the structure 5000'. Each stake 5040 may have a crown (not shown) at its top to prevent excessive penetration of the stake 5040 through the structure 5000' into the substrate underneath the structure 5000'. The stakes may be driven down by vibration of their top until the driving is stopped by the crown.

The substrate may be prepared for the structure 5000' by levelling. The leveling may include bringing sand or other suitable fill to the area underneath the structure 5000'. Sand or other loose and dense material may further be used to immobilize the structure 5000' by filling in the lower channels.

The Unique Performance Characteristics

1. In contrast to the prevailing paradigm, instead of opposing-reflecting and repelling waves, the sponge breakwater merely dissipates their power therein.
2. Drastic savings in material consumption, just about 3 to 6% of that of the conventional (fill material) breakwater.
3. Setup construction method: instead of transporting the materials, and providing the lifting facilities and conspicuous main work power (through the entire construction period), the sponge breakwater is constructed-assembled mostly in a coastal shipyard-like plant in far-reaching industrialized manner and brought to the sea as mega-block sections, at a time convenient from the point of view of weather and sea conditions. It is efficient and cost effective and relieves the in-land transport infrastructures from its burden.
4. Energy generation: clean-green sustainable energy may be generated by using the sponge breakwater as a carrying platform for a wave energy farm (along its frontage) utilizing the bursting-swirling waves into the interior of its tunnels; for a wind turbine farm, with sponge breakwater as its ground foundation; and solar panels farm, all collaborating and sharing in the same servicing and infrastructures.

5. Safe storage of liquid, gases or bulk brands. The special geometric nature of the continuous (hyperbolic) sponge structure permits inter-partitioning and provision for cellular or continuous compartments to store various substances, including hazardous and environmentally unfriendly ones (fuels, gasses, etc.), a natural geometric compartmentalization against leaks.

6. Marine agriculture: use of the breakwater's compartments and tunnel spaces for developing highly accessible marine farming, a "natural-like" reef or a marine zoo.

7. A facility for leisure and water sport (diving) activity as well as open public recreation areas.

8. The sponge breakwater, when pile supported or afloat, permits the submarine current regime, thus minimizing negative environmental effects.

9. Other energy dissipater structures that may be constructed of polyhyparic shells: for example, sound absorbers to sound-proof rooms or reduce their noise level.

10. Heat exchanger structures at various geometric scales that may be constructed of dual-intertwined polyhyparic shells; for example, cooling agent s in various industrial and chemical processes, as as in air-conditioning facilities.

The invention claimed is:

1. An energy dissipater comprising a plurality of solely interconnected thin shells formed of periodic polyhyparic minimal surfaces, forming a continuous structure that envelopes contiguous tunnels there through so as to form two separated and intertwined volumes wherein an energy water wave that confronts the energy dissipater is distributed between the two volumes; a volume occupied in the tunnels and an outer volume, so as to significantly and effectively dissipate the energy and wherein the energy dissipater is configured to withstand horizontal forces generated by said energy water wave.

2. The dissipater of claim 1, constructed from one or more material, selected from concrete, metal sheets, plastic resins, composite materials, and combinations thereof.

3. The dissipater of claim 2, wherein the concrete comprises materials selected from: reinforced concrete, shotcrete, ferrocement, fibre-reinforced concrete, and combinations thereof.

4. The dissipater of claim 2, wherein the concrete comprises at least one reinforcing material selected from corrugated sheets of metal, plastics, composite material, ferrocement, f.r.p. (fibre reinforced plastics), meshes made of metal, plastics, or composite material, and combinations thereof.

5. The dissipater of claim 1, wherein each shell segment is modular, and the dissipater comprises geometrically repetitive shells, whereby efficient mass production of the dissipater is facilitated.

6. The dissipater of claim 1, wherein the plurality of interconnected thin shells are manifested in one or more of the structures: cubic, diamond lattice; cube centered lattice; edge centered lattice, and octet lattice configuration and combinations thereof.

7. The dissipater of claim 1, wherein the tunnels are arranged according to a dual-intertwined cubic network pair.

8. The dissipater of claim 1, wherein the shells each independently have genus values between 2 and 13.

9. The dissipater of claim 1, wherein when the shells are made of reinforced concrete the shells have a thickness of 7 to 20 cm, and when the shells are made of metal or a composite material the shells have a thickness of 1-10 mm.

10. The dissipater of claim 1, having front and hind sides, wherein shells adjacent to the front side have a thickness larger than thickness of shells adjacent to the hind side.

11. The dissipater of claim 1, wherein virtual boxes circumscribing each shell have an edge size of between 1.0 and 12.0 meters.

12. The dissipater of claim 1, wherein a portion of the shells are configured to allow filling of air therein for floatability of the dissipater.

13. The dissipater of claim 1, further comprising corrosion protection selected from a group comprising: surface glaze, spray of plastic materials thereonto, and metallic reinforcement with cathodic protection thereof and combinations thereof.

14. The dissipater of claim 1, wherein a portion of the shells comprise ballast material adding to overall stability of the dissipater in water.

15. The dissipater of claim 1, further comprising anchoring devices.

16. The dissipater of claim 1, further comprising reinforcements and stiffening devices, selected from: beams, plates, rings, cables, opening cage stiffeners and combinations thereof.

17. The dissipater of claim 1, further comprising within at least a portion of openings in the tunnels wave turbines configured to allow harvesting energy of waves passing through the tunnels.

18. The dissipater of claim 1, immobilized by one or more of: ballast; dissipater foundations; pile support, and anchorage.

19. A method of using the energy dissipater of claim 1 at sea, the method comprising:
positioning the energy dissipater in the sea; and
orienting the tunnels at about 45° or parallel to the direction of wave frontages in the sea.

20. The continuous structure of claim 1, covered with epoxy.

* * * * *